2,884,306

METHOD OF SEGREGATING THORIUM COMPOUNDS

Douglas H. Fenske and Roy T. Sorensen, Lakeland, Fla., assignors to International Minerals & Chemical Corporation, a corporation of New York No Drawing. Application April 12, 1956
Serial No. 577,667

4 Claims. (Cl. 23—14.5)

This invention relates to the recovery of thorium compounds. More particularly, it relates to the separation of thorium silicate minerals from iron constituents with which the minerals are found associated in ferruginous ores.

Thorium compounds are not liberated from the other constituents of predominantly silicate or so-called thorite-type ores by grinding in the economic size range, for example in the range of about 8 to about 150 mesh. Some upgrading is possible by flotation and gravity separation treatments, but such upgrading as occurs is due to elimination of materials such as barite, feldspar and the like, and an appreciable separation is not made between the iron and thorite minerals.

It is a primary object of this invention to provide a method specifically adapted to separate thorite from iron minerals such as hematite, limonite, siderite, magnetite, etc.

It is another object to segregate thorite-type minerals so that when processed for recovery by digestion with acids, the major acid consumers are eliminated.

It is still another object to provide a novel process to separate thorite-type minerals from iron, involving fluxing the ore at elevated temperatures.

These and the other objects of the invention will be apparent to those skilled in the art from the following description.

In carrying out the process, thorite-type ore such as is found in the Wet Mountain section of Colorado or Lemhi Pass section of Montana, is crushed and ground and sized to recover a comminuted feed generally in the range between about 4 mesh and about 20 mesh standard screen size. This comminuted feed will vary considerably in composition, an essentially silicate form of thorium being combined in variable mixtures with hematite, quartz, and feldspar, with carbonate and sulfate materials being present in some ores.

This comminuted material is dry mixed with suitable fluxing and reducing agents prior to heat treatment. The quantity of fluxing and reducing agents will vary depending upon the relative proportions of hematite and silicate and carbonate materials present. Principal agents to be added are the alkali metal carbonates such as $Na_2CO_3$ and $K_2CO_3$, which are basic fluxes, boron compounds such as Na borate to reduce fluidity of the slag, lime or limestone to lower the density of the slag, and the reducing agent which may be carbon in various forms such as charcoal, flour, petroleum coke and the like.

The fluxing agents are generally added in quantities giving 100 to 200 parts by weight of fluxing agent per 100 parts by weight of slagging material.

The amount of reducing agent added is dependent upon the quantity of hematite or equivalent Fe compounds present. For an ore containing 30 parts by weight of hematite, 10 to 20 parts by weight of charcoal are usually added.

The dry mix is heated in suitable apparatus such as a blast furnace, muffle furnace, reverberatory furnace and the like where the temperature may be raised high enough to convert the dry mix to a freely flowing molten mass. In the furnace, the temperature of the mix must be raised to one in the range between about 2300° F. and about 2800° F. depending upon the composition of the mixture.

When the mixture has become molten, the molten mass is tapped from the furnace into a cooling pit where the iron accumulates at the bottom of the pit and the slag of miscellaneous material separates as a floating slag. This slag layer contains substantially all of the thorium material while the pig iron is substantially free of thorium material.

The invention is further illustrated by the following example.

Ore from the Wet Mountain section of Colorado was crushed and screened to recover a feed of —4 mesh size material. This ore analyzed:

|  | Percent |
|---|---|
| $ThO_2$ | 3.96 |
| $Fe_2O_3$ | 35.8 |
| $CO_2$ | 11.6 |

To 100 parts by weight of this ore were added 100 parts by weight of soda ash ($Na_2CO_3$), 50 parts by weight of borax ($Na_2B_4O_7 \cdot 10H_2O$), 11 parts by weight of lime (CaO), and 12 parts by weight of wood charcoal. After thorough blending, the mixture was charged to a muffle furnace and the temperature of the solids raised to 2520° F. After 10 minutes at 2520° F., the molten charge was withdrawn to a cooling pit. Upon cooling to room temperature, the top layer of glass slag was easily removed from the underlayer of pig iron.

Slag and iron layers showed the following analyses:

| Product | Percent Wt. | Percent Fe | Percent $ThO_2$ |
|---|---|---|---|
| Pig Iron | 12.5 | 91.8 | 0.0 |
| Slag | 87.5 | 1.0 | 1.7 |

The process accomplishes a substantially complete separation of Fe and thorium compounds which are closely associated in the ore.

Having thus described our invention, what we claim is:

1. A process for separation of iron from thorium compounds found associated in ferruginous formations containing thorium silicate minerals which comprises comminuting the ferruginous ore, mixing with 100 parts by weight of the comminuted ferruginous ore between 100 and 200 parts by weight of alkali metal carbonate and borate salt fluxing agent and carbon in a form effective as a reducing agent under the treating conditions thereafter employed, heating the mixture to a temperature in the range between about 2300° F. and about 2800° F., whereby the iron compounds therein are reduced to metallic iron and the remaining materials are converted into a slag containing substantially all of the thorium compounds, allowing the iron and slag phases to stratify, cooling the molten mixture, and separating the glass slag upper layer containing thorium compounds from the bottom layer of pig iron.

2. A process for separation of iron from thorium compounds found associated in ferruginous formations containing thorium silicate minerals which comprises comminuting the ferruginous ore, mixing with the comminuted ore soda ash, sodium borate, lime and charcoal, heating the mixture to a molten condition, whereby the iron compounds in said ore are reduced to metallic iron and the remaining materials are converted into a slag containing substantially all of the thorium compounds, stratifying the molten mixture while cooling, and separating the glass slag upper layer containing thorium compounds from the bottom layer of pig iron.

3. A process for separating thorium compounds from association with iron in ferruginous ores containing thorium silicate minerals which comprises comminuting the ferruginous ore, mixing therewith alkali metal carbonate and borate salt fluxing agents and carbon in a form effective as a reducing agent under the treating conditions thereafter employed, heating the mixture to molten condition, whereby the iron compounds are reduced to metallic iron and the remaining materials are converted into a slag containing substantially all of the thorium compounds, allowing the iron and slag phases to stratify, and separating said phases.

4. The process of claim 3 wherein said mixture is heated to a temperature between about 2300 and about 2800° F.

No references cited.